United States Patent [19]

Iwama et al.

[11] Patent Number: 4,705,986
[45] Date of Patent: Nov. 10, 1987

[54] HIGH COLOR RENDERING FLUORESCENT LAMP

[75] Inventors: Katsuaki Iwama, Suita City; Mutsuo Takahashi; Haruo Shibata, both of Takatsuki, all of Japan

[73] Assignee: Matsushita Electronics Corporation, Kadoma, Japan

[21] Appl. No.: 8,144

[22] Filed: Jan. 22, 1987

Related U.S. Application Data

[63] Continuation of Ser. No. 707,866, Mar. 4, 1985, abandoned.

[30] Foreign Application Priority Data

Aug. 2, 1984 [JP] Japan .................................. 59-163313

[51] Int. Cl.⁴ .............................................. H01J 61/48
[52] U.S. Cl. .............................. 313/487; 252/301.4 F
[58] Field of Search ................................. 313/485–487; 252/301.4 F, 301.4 H

[56] References Cited

U.S. PATENT DOCUMENTS

| | | | |
|---|---|---|---|
| 3,569,764 | 3/1971 | Hanada | 313/487 |
| 4,088,923 | 5/1978 | Manders | 313/487 |
| 4,267,485 | 5/1981 | Murakami et al. | 313/486 |
| 4,431,942 | 2/1984 | Thornton | 313/487 |

Primary Examiner—David K. Moore
Assistant Examiner—Sandra L. O'Shea
Attorney, Agent, or Firm—Cushman, Darby & Cushman

[57] ABSTRACT

A high color rendering fluorescent lamp having two-layered phosphor coating, wherein a first layer is formed immediately on the inner face of glass tube containing phosphors of alkaline earth halophosphate activated by antimony manganese or of alkaline earth holophosphate activated by antimony or both, and a second layer (an overriding layer) is formed on the first layer containing a phosphor having peak wavelength of emission at 470 nm–500 nm and absorbing line spectrum of mercury in visible short wavelength range, at least one of a phosphor of $(Sr, Mg)_3(PO_4)_2:Sn$ and a phosphor of $(Sr, Ba)_3(PO_4)_2:Sn$.

3 Claims, 2 Drawing Figures

HIGH COLOR RENDERING FLUORESCENT LAMP

This is a continuation of application Ser. No. 707,866 filed Mar. 4, 1985 which was abandoned upon the filing hereof.

BACKGROUND OF THE INVENTION

1. Field of the Invention

The present invention relates generally to a high color rendering fluorescent lamp, and particularly concerns a high color rendering fluorescent lamp having a two-layered phosphor coating.

2. Description of the Prior Art

Hitherto, phosphors generally used in fluorescent lamps of general illumination use have been phosphors of antimony-manganese-activated calcium halophosphate. In this phosphor, depending on ratio of antimony and manganese concentrations added as additives, white light of various color temperatures is efficiently obtained. Therefore a highly efficient fluorescent lamp having light of broad spectral distribution is obtainable with a single compound of cheap expense as a starting material, and the phosphor is one of the most splendid from an industrial view point. However, in the fluorescent lamp using the abovementioned phosphor, though having high efficiency, the use of the lamp in a field of use wherein color rendering is regarded important has been limited, because they have poor color rendering by possessing a general color rendering index of about 55 to 75.

As a conventional fluorescent lamp having a high color rendering, for instance, the EDL (Extra De Lux) type fluorescent lamp, having two layers of phosphor coating is known. Therein, a first layer comprises mixture of several phosphors prepared so as to approximate the spectral distribution of a reference illuminant and a second, i.e., overriding layer functions to absorb the bright line spectra of mercury in a short wavelength part of the visible range, which are not desirable for attainment of high color rendering (Japanese Patent Examined Publication Sho No. 41-9868). In such conventional EDL type fluorescent lamp with the double-layered coating, as a result of forming a layer containing titanium oxide and yellow pigment immediately on the inner face of tube wall as the layer to absorb the spectral line of mercury in the short wavelength part of the visible range, loss to some extent of the lamp efficiency has been inevitable, and improvement of the efficiency has long been the object of improvement of the fluorescent lamp.

In recent years, improvement of efficiency of the high color rendering fluorescent lamp has been strenuously tried, and for the EDL type fluorescent lamp, which utilizes blue-green emitting phosphor comprising a phosphor of strontium-boron phosphate activated by a divalent europium, a phosphor of an alkaline earth halophosphate activated by divalent europium having the formula $(Ba, Ca, Mg)_{10}(PO_4)_6Cl_2:Eu$, a phosphor of a strontium-magnesium aluminate activated by a divalent europium and a phosphor of strontium aluminate activated by divalent europium have been proposed as the material to suppress the spectral line of mercury, and an improvement in single layer coating to some extent has been achieved. In the above-mentioned single layer coating fluorescent lamp, however, the blue-green emitting phosphor functions to absorb all emission energy of even other phosphors, since the bluegreen emitting phosphor is distributed uniformly in the single-layered phosphor coating. Accordingly, the single-layered EDL type fluorescent lamp has a problem of insufficient output of all emission energy of the phosphors. Furthermore, since the blue-green emission phosphor has the above-mentioned absorption, the phosphor itself has a yellow-green body color, and therefore when coated in the fluorescent lamp in the single layer coating, even when the phosphor is used as a mixture with other phosphor, the appearance of the lamp face has yellow-green body color as far as the phosphor coating is a single layer.

The inventors carried out many detailed experiments in applications of many phosphors having absorption in the short wavelength part of visible range utilized together with other phosphor(s) for methods of taking out largest emission energy. An example of spectral reflection characteristics of blue-green emitting phosphors used in the experiments, that of a phosphor of strontium aluminate activated by a divalent europium (i.e. having the general formula $Sr_{4-x}Eu_xAl_{14}O_{25}$) is shown in FIG. 1. As is obvious from FIG. 1, the blue-green emitting phosphor shows strong absorption in the visible short wavelength range and still has about 5 to 10% of continuous absorption in the side of longer wavelength. In FIG. 1, curve 1 is for $Sr_{3.98}Eu_{0.02}Al_{14}O_{25}$, curve 2 is for $Sr_{3.92}Eu_{0.08}Al_{14}O_{25}$, curve 3 is for $Sr_{3.60}Eu_{0.40}Al_{14}O_{25}$ and curve 4 is for $Sr_{3.20}Eu_{0.80}Al_{14}O_{25}$. As the concentration of europium increases, the absorptions in the visible short wavelength range increase and the continuous absorptions in longer wavelength part also increase. In order to utilize the absorptions in the visible short wavelength range more effectively and to decrease as small as possible the continuous absorption in the visible light at the longer wavelength part, the conventional method of providing on the inner face of the glass tube a phosphor layer comprising a phosphor having the absorption effect can not produce a sufficient result. The reason is that the emission energy of the fluorescent lamp necessarily pass through the underlying phosphor layer thereby causing absorption of a part at longer wavelength part of the visible light.

Furthermore, the inventors made experimental study on the examples of the fluorescent lamps with single-layered phosphor coating. In the single-layered coating type fluorescent lamp, the defect of the appearance of yellow-green body color can not be eliminated because the phosphor having the effect of the above-mentioned absorption is uniformly distributed in the single-layered phosphor coating.

SUMMARY OF THE INVENTION

An object of the present invention is to provide an improved high color rendering fluorescent lamp, which can eliminate the above-mentioned conventional problems in the fluorescent lamp with double-layered phosphor coating and can effectively utilize the blue-green emitting phosphor which has absorption in the visible short wavelength, thereby greatly improving lamp efficiency.

The high color rendering fluorescent lamp in accordance with the present invention comprises:

a transparent enclosure containing means for generating ultraviolet light, a first phosphor layer which is provided on the inner face of the transparent enclosure and contains at least one of a phosphor of an alkaline earth metal halophosphate activated by antimony-manganese and a phosphor of alkaline earth metal halophosphate activated by antimony, and a second phosphor layer which is provided further on the first phosphor layer and contains at least a phosphor having peak wavelength of emission at 470 nm–500 nm and absorbing bright line spectrum of mercury in visible short wavelength range, a phosphor of strontium-magnesium phosphate activated by tin having the formula $(Sr,Mg)_3(PO_4)_2:Sn$ and a phosphor of strontium-barium-magnesium phosphate activated by tin having the formula $(Sr, Ba, Mg)_3(PO_4)_2:Sn$.

The fluorescent lamp in accordance with the present invention has a greatly improved lamp efficiency as well as satisfactorily white appearance of lamp, while performing a high color rendering.

The advantage of the invention is most prominent when half-width of the blue-green emitting phosphor is about 70 nm, and in that case, the lamp efficiency can be much improved without lowering the color rendering. Furthermore, even when the above-mentioned half-width is relatively large, for instance, about 100 nm, the improvement of the lamp efficiency is still great though the color rendering is slightly lower from the optimum performance. Therefore, still there is technical advantages in decreasing amount of use of expensive rare earth phosphor, improvement of lamp appearance and improvement of the life characteristic.

DESCRIPTION OF THE PREFERRED EMBODIMENT

The inventors made many experimental studies in order to find measures to effectively absorb the bright spectrum lines of mercury in the visible short wavelength range which are harming improvement of color rendering of fluorescent lamp, and tried to make a layer containing the phosphor which has the effect of absorbing the bright spectrum lines of mercury on the inside layer (a second layer), in contradistinction to the prior art configuration having a phosphor layer which absorbs the bright line spectrum as the layer coated immediately on the inner side of the transparent enclosure. That is, absorption efficiency of the mercury spectrum lines in the visible short wavelength range is improved by providing a phosphor layer, which absorbs the mercury spectrum lines inside or on a first phosphor layer; and thereby the lamp efficiency can be improved without undesirably absorbing necessary emission energy by other phosphors used.

The preferred embodiments are elucidated with reference to the following examples.

EXAMPLE 1

| | |
|---|---|
| $Ca_{10}(PO_4)_6(F, Cl)_2:Sb$ | 60 g and |
| $Ca_{10}(PO_4)_6(F, Cl)_2:Sb, Mn(6500° K.)$ | 40 g, | the above-mentioned phosphors together with known binder are blended to form a phosphor slurry and applied with a thickness rate of 2.7 mg/cm$^2$ on the inner face of a glass tube as the enclosure of a fluorescent lamp to form an underlying first layer, i.e. an outer layer. Then,

| | |
|---|---|
| $Sr_{3.92}Al_{14}O_{25}:Eu_{0.08}$ | 25 g |
| $(Sr, Mg)_3(PO_4)_2:Sn$ | 75 g, | the above-mentioned phosphors together with known binder are blended to form a phosphor slurry and applied on the above-mentioned first layer with a thickness rate of 2.7 mg/cm$^2$ as an overriding second layer, i.e., an inner layer.

Figure 1:
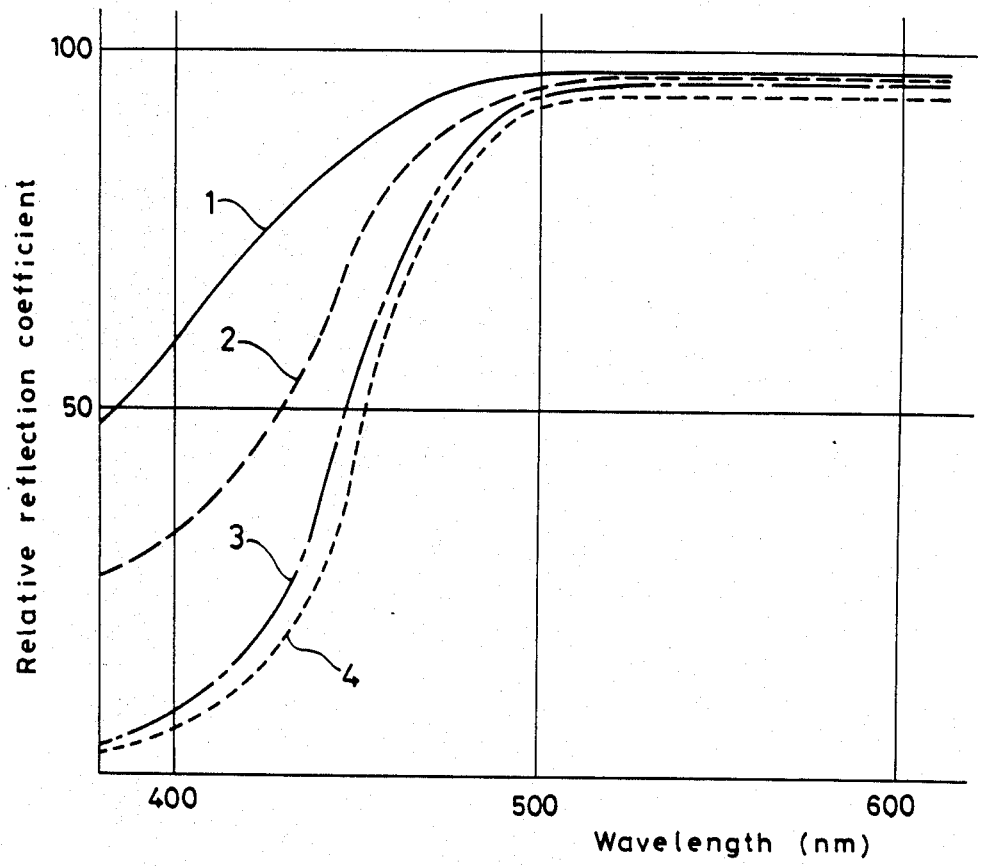
FIG. 1 is the graph of spectral distributions of relative reflection coefficients of the blue-green emitting phosphors.
Figure 2:
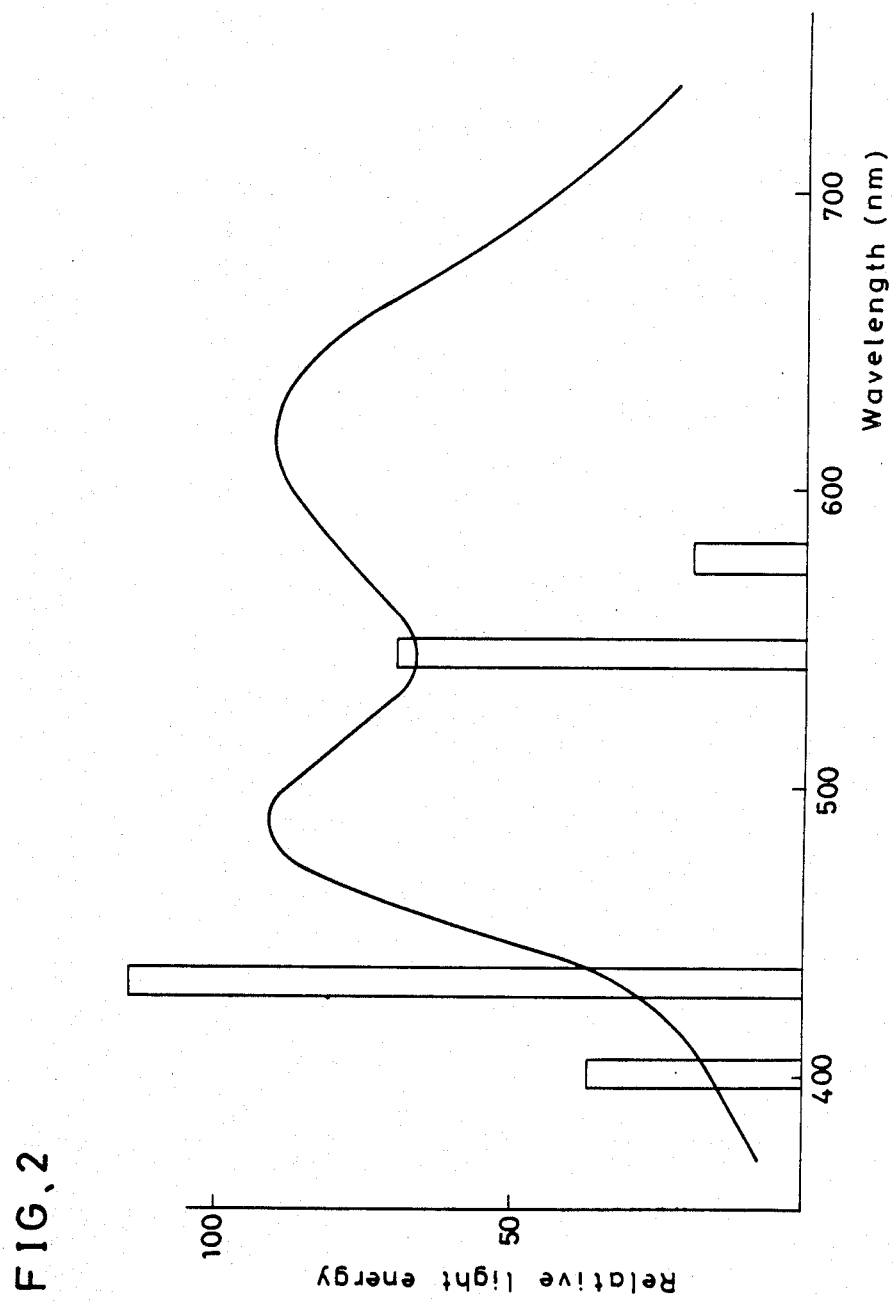
FIG. 2 is a graph of spectral distribution of relative light energy of the fluorescent lamp made in accordance with the present invention.

Then, by fixing a pair of known electrodes on both ends of the tube and sealing known discharge gases and mercury drops, a 32 mm diameter - 40 w type straight tube fluorescent lamp is manufactured. This fluorescent lamp shows a general color rendering index Ra of 98 and color temperature of 5000° K., and a satisfactory white appearance. Spectral distribution of relative light energy of this lamp is shown by a solid curve in FIG. 2. This lamp has a performance of initial lumen output (at 100 hour service) of 2420 lm, which is obviously improved in comparison with a prior art example, wherein the phosphor coating is formed as a single layer using the above-mentioned four kinds of phosphors in such a component ratio as to make the color temperature of 5000° K. and Ra of 98, but a lower initial lumen output (at 100 hours service) of 2350 lm, and has a yellowish appearance.

EXAMPLE 2

| | |
|---|---|
| $Ca_{10}(PO_4)_6(F, Cl)_2:Sb, Mn(10000° K.)$ | 98 g and |
| $BaMg_2Al_{16}O_{27}:Eu$ | 2 g, | the above-mentioned phosphors together with known binder are blended to form a phosphor slurry and applied with a thickness of 2.7 mg/cm$^2$ on the inner face of a glass tube as the enclosure of a fluorescent lamp to form an underlying first layer, i.e., an outer layer. Then,

| | |
|---|---|
| $Sr_{3.88}Al_{14}O_{25}:Eu_{0.12}$ | 27 g and |
| $(Sr, Mg)_3(PO_4)_2:Sn$ | 73 g, | the above-mentioned phosphors together with known binder are blended to form a phosphor slurry and applied on the above-mentioned first layer with a thickness rate of 2.7 mg/cm$^2$ as an overriding second layer, i.e., an inner layer.

Then, by fixing a pair of known electrodes on both ends of the tube and sealing known discharge gases and mercury drops, a 32 mm diameter - 40 w type straight tube fluorescent lamp is manufactured. This fluorescent lamp shows a general color rendering index Ra of 99 and color temperature of 5600° K., and a satisfactory white appearance. Spectral distribution of relative light energy of this lamp is similar to the solid curve in FIG. 2. This lamp has a performance of initial lumen output (at 100 hour service) of 2390 lm, which is obviously improved in comparison with a prior art example, wherein the phosphor coating is formed as a single layer using the above-mentioned four kinds of phosphors in such a component ratio as to make the color temperature of 5000° K. and Ra of 99, but a lower initial lumen output (at 100 hours service) of 2330 lm, and has a yellowish appearance.

EXAMPLE 3

| | |
|---|---|
| $Ca_{10}(PO_4)_6(F, Cl)_2$:Sb, Mn(6500° K.) | 100 g, | the above-mentioned phosphor together with known binder are blended to form a phosphor slurry and applied with a thickness rate of 2.3 mg/cm² on the inner face of a glass tube as enclosure of a fluorescent lamp to form an underlying first layer, i.e., an outer layer. Then,

| | |
|---|---|
| $(Sr_{1.85}Mg_{0.7}Al_{10.2})_{18}$:$Eu_{0.15}$ | 40 g and |
| (Sr, Mg, Ba)$_3$(PO$_4$)$_2$:Sn | 60 g, | the above-mentioned phosphors together with known binder are blended to form a phosphor slurry and applied on the above-mentioned first layer with a thickness rate of 3.0 mg/cm² as an overriding second layer, i.e., an inner layer.

Then, by fixing a pair of known electrodes on both ends of the tube and sealing known discharge gases and mercury drops, a 32 mm diameter - 40 w type straight tube fluorescent lamp is manufactured. This fluorescent lamp shows a general color rendering index Ra of 92 and color temperature of 5000° K., and a satisfactory white appearance. Spectral distribution of relative light energy of this lamp is similar to the solid curve in FIG. 2. This lamp has a performance of initial lumen output (at 100 hours service) higher by 2% than a prior art example, wherein the phosphor coating is formed as a single layer using the above-mentioned three kinds of phosphors in such a component ratio as to make the color temperature of 5000° K. and Ra of 98 and has a yellowish appearance.

Though a comparison example, wherein a single layered phosphor coating comprising a mixture of $Sr_{1.85}Mg_{0.7}Al_{10.2}O_{18}$:$E_{0.15}$ and (Sr, Mg, Ba)$_3$(PO$_4$)$_2$:Sn mixed in such a component ratio as to make the color temperature of 5000° K., can attain an Ra of 98, the lamp of Example 3 attains only Ra=92. This is because that the half width (width of light emission spectrum measured by 50% of maximum light emission) of the phosphor $Sr_{1.85}Mg_{0.7}Al_{10.2}O_{18}$: $Eu_{0.15}$ used to absorb visible short wavelength range is so broad as 105 nm, and therefore that only with spectral distribution of emission obtained by combining it with the second phorsphor (Sr, Mg, Ba)$_3$(PO$_4$)$_2$:Sn a sufficiently high Ra value is achievable.

EXAMPLE 4

| | |
|---|---|
| $Ca_{10}(PO_4)_6(F, Cl)_2$:Sb, Mn(10000° K.) | 100 g, | the above-mentioned phosphor together with known binder are blended to form a phosphor slurry and applied with a thickness rate of 3.0 mg/cm² on the inner face of a glass tube as enclosure of a fluorescent lamp to form an underlying first layer, i.e., an outer layer. Then,

| | |
|---|---|
| $Sr_{1.96}P_{1.68}B_{0.32}O_{6.68}$:$Eu_{0.04}$ | 45 g, |
| (Sr, Mg)$_3$(PO$_4$)$_2$:Sn | 50 g and |
| $Ca_{10}(PO_4)_6(F, Cl)_2$:Sb, Mn(6500° K.) | 5 g, | the above-mentioned phosphors together with known binder are blended to form a phosphor slurry and applied on the above-mentioned first layer with a thickness rate of 3.0 mg/m² as an overriding second layer, i.e., an inner layer.

Then, by fixing a pair of known electrodes on both ends of the tube and sealing known discharge gases and mercury drops, a 32 mm diameter - 40 w type straight tube fluorescent lamp is manufactured. This fluorescent lamp shows a general color rendering index Ra of 94 and color temperature of 5000° K., and a satisfactory white appearance. Spectral distribution of relative light energy of this lamp is similar to the solid curve in FIG. 2. This lamp has a performance of initial lumen output (at 100 hour service) of 2350 lm, which is obviously improved in comparison with a prior art example, wherein the phosphor coating is formed as a single layer using the above-mentioned three kinds of phosphors in such a component ratio as to make the color temperature of 5000° K. and Ra of 97, but a lower initial lumen output (at 100 hours service) of 2290 lm, and has a yellowish appearance.

What is claimed is:

1. A high color rendering fluorescent lamp having:
    a transparent enclosure containing means for generating ultraviolet light,
    a first phosphor layer which is provided on the inner face of said transparent enclosure and contains at least one of a phosphor of an alkaline earth metal halophosphate activated by antimony-manganese and a phosphor of alkaline earth metal halophosphate activated by antimony, and
    a second phoshor layer which is provided further on said first phosphor layer and contains at least a phosphor of strontium-aluminate activated by divalent europium indicated by the general formula $Sr_{4-x}Eu_xAl_{14}O_{25}$, wherein $0.02 \leq x \leq 0.80$, having a peak wavelength of emission at 470 nm–500 nm and absorbing the bright line spectrum of mercury in the visible short wavelength range, and at least one member selected from the group consisting of a phosphor of strontium-magnesium phosphate activated by tin having the formula (Sr, Mg)$_3$(PO$_4$)$_2$:Sn and a phosphor of strontium-barium-magnesium phosphate activated by tin having the formula (Sr, Ba, Mg)$_3$(PO$_4$)$_2$:Sn.

2. A high color rendering flourescent lamp in accordance with claim 1, wherein
    said phosphors in said first phosphor layer consist of at least one selected from the group consisting of a phosphor of an alkaline earth metal halophosphate activated by antimony-manganese and a phosphor of alkaline earth metal halophosphate activated by antimony.

3. A high color rendering fluorescent lamp in accordance with claim 1, wherein
    said phosphors in said first phosphor layer consists of a phosphor of an alkaline earth metal halophosphate activated by antimony-manganese and a phosphor of a barium-magnesium aluminate activated by a divalent europium.

* * * * *